(12) United States Patent
Jun et al.

(10) Patent No.: US 7,107,604 B2
(45) Date of Patent: Sep. 12, 2006

(54) DISK CARTRIDGE

(75) Inventors: Gyu-chan Jun, Seoul (KR); Soon-kyo Hong, Seoul (KR); Dong-seob Jang, Seoul (KR); Young-min Cheong, Seoul (KR); Du-il Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/029,910

(22) Filed: Dec. 31, 2001

(65) Prior Publication Data

US 2003/0053408 A1 Mar. 20, 2003

(30) Foreign Application Priority Data

Sep. 12, 2001 (KR) ................. 2001-56224

(51) Int. Cl.
*G11B 23/03* (2006.01)
(52) U.S. Cl. .................................. 720/736
(58) Field of Classification Search ........... 369/291; 360/133; 206/308.1; 720/725, 736
See application file for complete search history.

(56) References Cited

U.S. PATENT DOCUMENTS

| 4,542,495 A | 9/1985 | Ziegler et al. | |
| 5,311,494 A | * 5/1994 | Sugita et al. ........ | 369/100 |

FOREIGN PATENT DOCUMENTS

| EP | 510889 A1 | * | 10/1992 |
| JP | 62267985 A | * | 11/1987 |
| JP | 01021780 A | * | 1/1989 |
| JP | 01315085 A | * | 12/1989 |
| JP | 02033783 A | * | 2/1990 |
| JP | 03212874 A | * | 9/1991 |
| JP | 03254482 A | * | 11/1991 |
| JP | 04245081 A | * | 9/1992 |
| JP | 04319587 A | * | 11/1992 |
| JP | 04358379 A | * | 12/1992 |
| JP | 05282827 A | * | 10/1993 |
| JP | 06012813 A | * | 1/1994 |
| JP | 06020429 A | * | 1/1994 |
| JP | 6-76523 | | 3/1994 |
| JP | 06076523 A | * | 3/1994 |
| JP | 06168565 A | * | 6/1994 |
| JP | 06203522 A | * | 7/1994 |
| JP | 07176162 A | * | 7/1995 |
| JP | 08221927 A | * | 8/1996 |
| JP | 11306710 A | * | 11/1999 |
| JP | 2000-48514 | | 2/2000 |
| JP | 2000048514 A | * | 2/2000 |
| JP | 2000-285459 | | 10/2000 |
| JP | 2001-76453 | | 3/2001 |
| WO | WO 9003642 A1 | * | 4/1990 |

OTHER PUBLICATIONS

Japanese Office Action dated Jun. 3, 2003.
Taiwanese Patent Application No. 090129245 Office Action dated Sep. 2, 2003.

* cited by examiner

Primary Examiner—William J Klimowicz
(74) Attorney, Agent, or Firm—Stein, McEwen and Bui, LLP (57) ABSTRACT

A disk cartridge is provided. The disk cartridge includes a case for containing a disk and a transparent window installed to seal the case. An external light accesses the disk through the transparent window of the disk cartridge. However, foreign matter such as dust is prevented from entering the disk cartridge.

20 Claims, 5 Drawing Sheets

DISK CARTRIDGE

CROSS-REFERENCE TO RELATED APPLICATIONS

This application claims the benefit of Korean Application No. 2001-56224, filed Sep. 12, 2001, in the Korean Industrial Property Office, the disclosure of which is incorporated herein by reference.

BACKGROUND OF THE INVENTION

1. Field of the Invention

The present invention relates to a disk cartridge containing a disk, which is an information recording/reproducing medium, and more particularly, to a disk cartridge capable of inhibiting an inflow of dust from the outside.

2. Description of the Related Art

Figure 1:
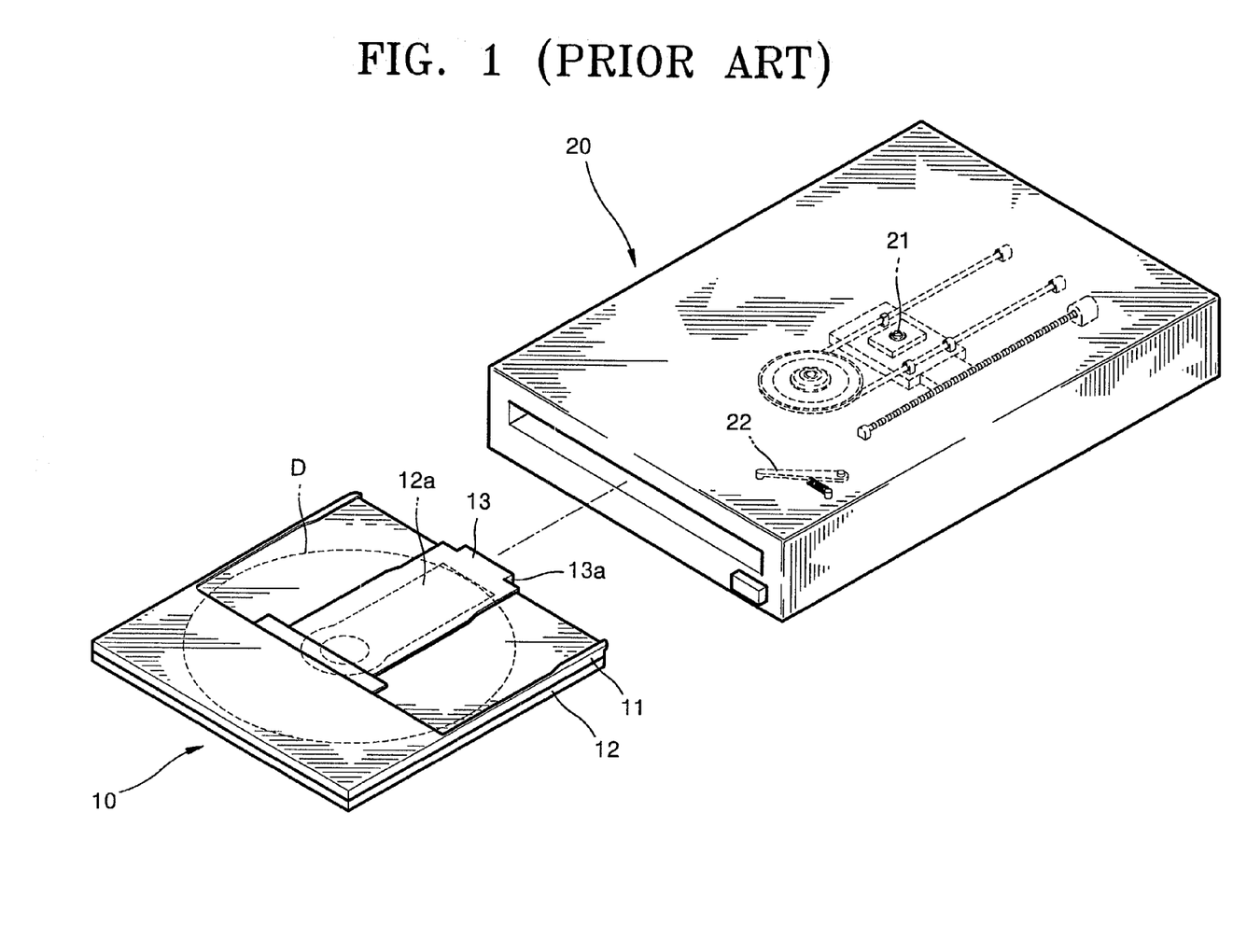
FIG. 1 is a drawing showing a conventional disk cartridge next to a disk drive device.
Figure 2A:
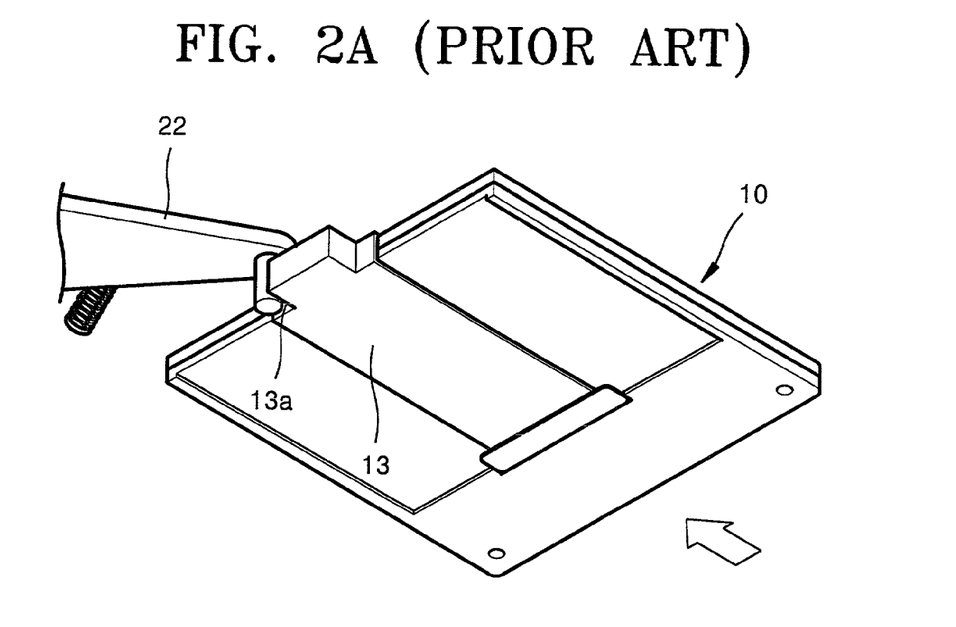
FIGS. 2A and 2B are drawings which illustrate a process of opening a shutter of the conventional disk cartridge shown in FIG. 1.
Figure 2B:
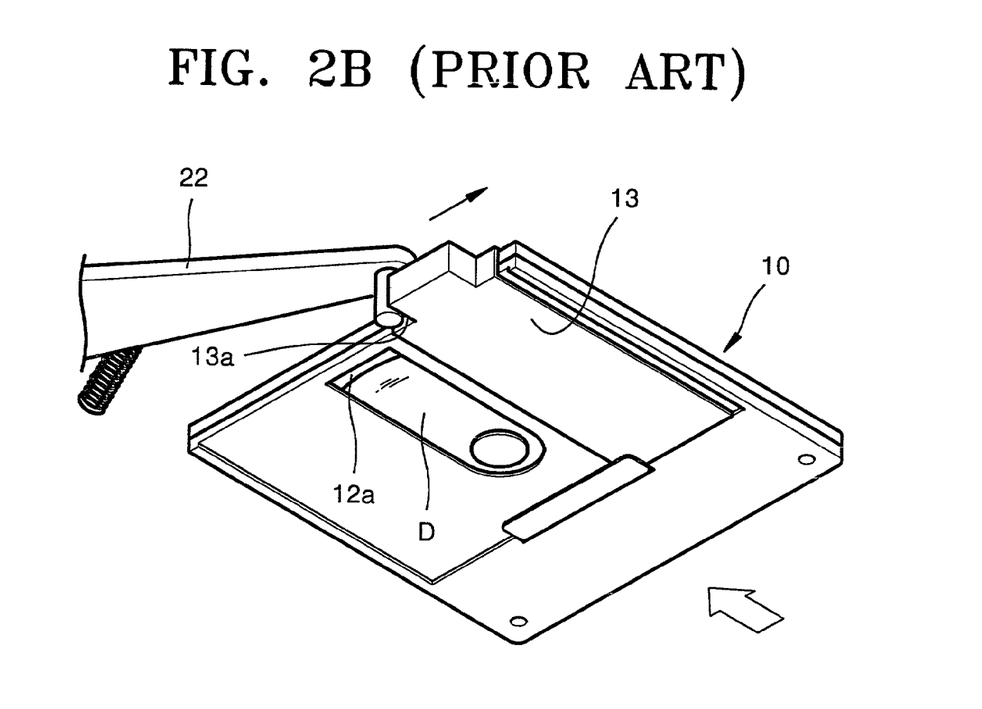

FIG. 1 shows a conventional disk cartridge 10 which contains a disk D that will be used in a disk drive device 20. The disk cartridge 10 includes upper and lower cases 11 and 12 and a shutter 13. The upper and lower cases 11 and 12 form an inner space in which the disk D is contained. The shutter 13 selectively opens and closes an opening hole 12a formed at the lower case 12 so as to allow a pickup 21 of the disk drive device 20 to access the disk D. An opening lever 22 installed in the disk drive device 20 opens and closes the shutter 13. FIGS. 2A and 2B show that as the disk cartridge 10 enters the disk drive device 20, a peg on an end of the opening lever 22 contacts and pushes a protrusion 13a of the shutter 13 to open the shutter 13.

The disk D is contained in the disk cartridge 10 to be protected from foreign matter such as dust which can hinder the accurate processing of a signal during a recording or reproducing operation. However, the shutter 13 must be opened to allow the pickup 21 of the disk drive device 20 to access the disk D. Thus, dust flows into the disk cartridge 10 through the opening hole 12a. In other words, while the disk D is kept in the disk cartridge 10 to be protected from dust, dust flown into the disk cartridge 10 through the opening hole 12a cannot be prevented when the disk cartridge 10 is inserted into the disk drive device 20. Therefore, there is a need for a way to prevent dust from entering the disk cartridge 10 through the opening hole 12a during a recording and reproducing operation.

SUMMARY OF THE INVENTION

Accordingly, it is an object of the present invention to provide an improved disk cartridge which can exclude the possibility of an inflow of dust from the outside when the disk cartridge is inserted into a disk drive device.

Additional objects and advantages of the invention will be set forth in part in the description which follows and, in part, will be obvious from the description, or may be learned by practice of the invention.

To achieve the above and other objects of the present invention, there is provided a disk cartridge which includes a case for containing a disk and a transparent window installed to the case so as to allow an external light to access the disk in the case.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Reference will now be made in detail to the present preferred embodiments of the present invention, examples of which are illustrated in the accompanying drawings, wherein like reference numerals to like elements throughout.

Figure 3:
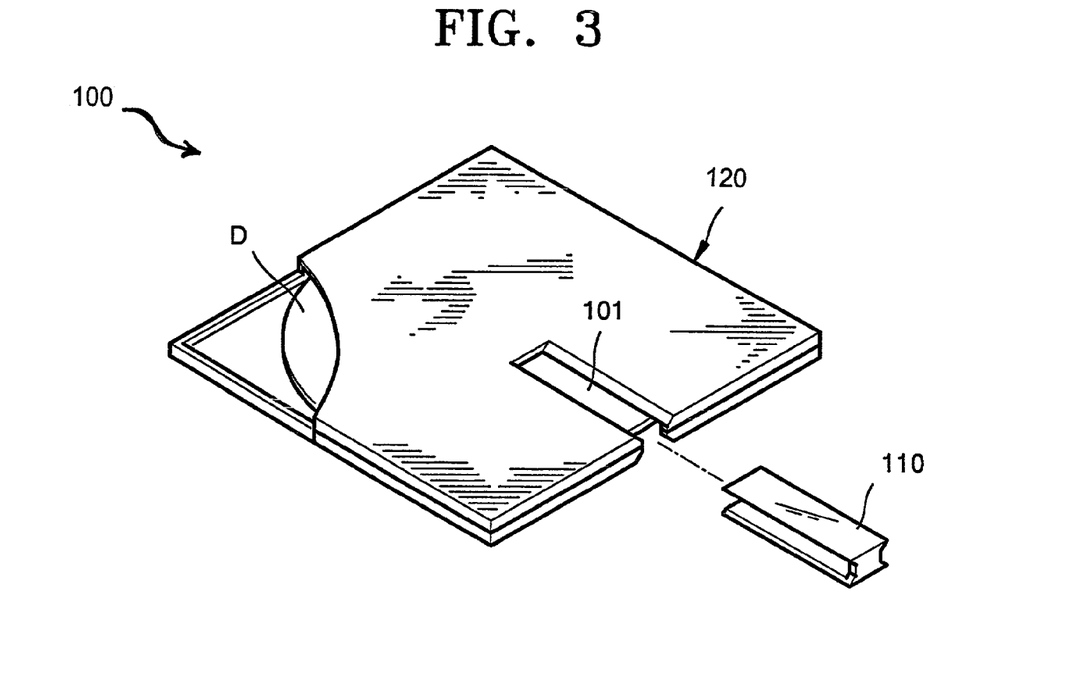
FIG. 3 is a perspective view of a disk cartridge having a case and a transparent window according to an embodiment the present invention.
Figure 4:
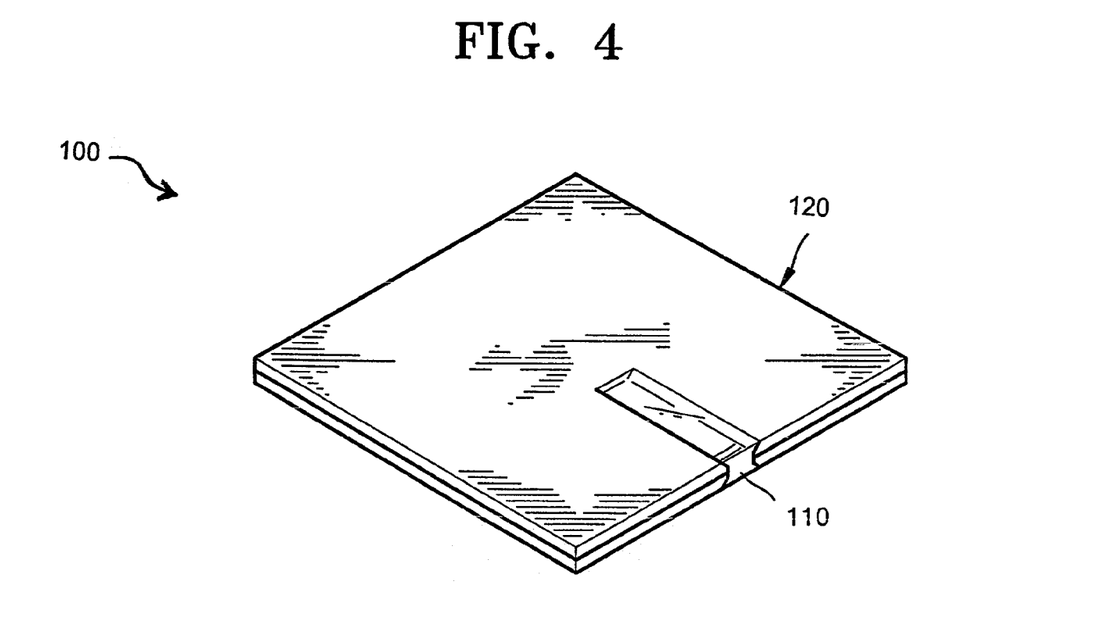
FIG. 4 is a perspective view showing the case and the transparent window shown in FIG. 3, in a combined state.

FIGS. 3 and 4 show a disk cartridge 100 which includes a case 120 and a transparent window 110. The case 120 forms a space for containing a disk D. The transparent window 110 is installed in an opening hole 101 of the case 120 so as to allow a light emitted from a recording/reproducing unit such as the pickup 21 shown in FIG. 1, to access the disk D. The transparent window 110 is formed of a transparent material such as acryl or a glass.

Figure 5:
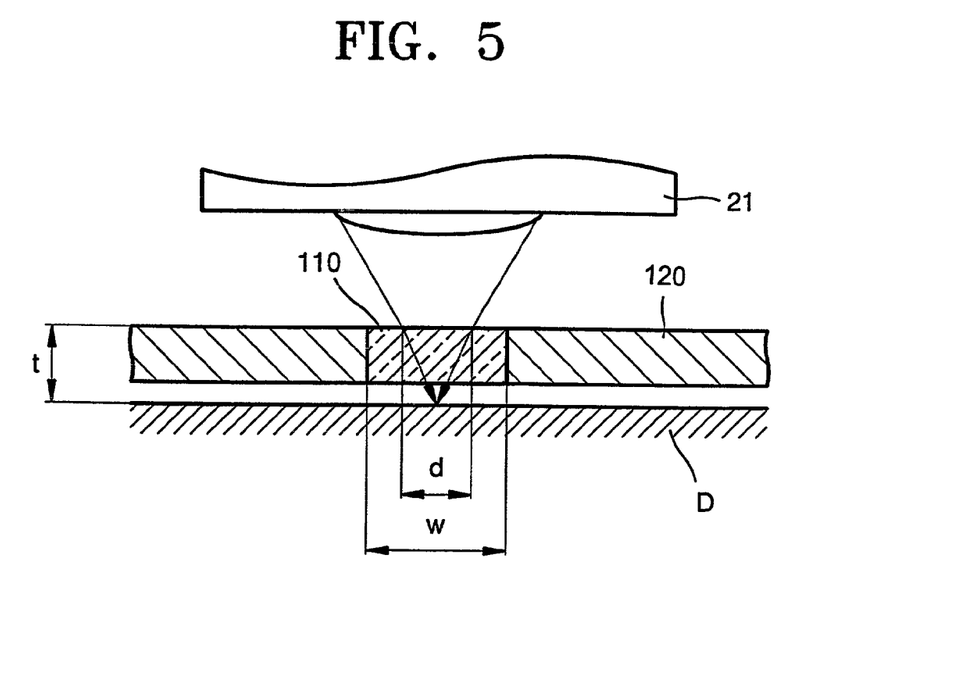
FIG. 5 is a drawing showing a light access process through the transparent window of the disk cartridge shown in FIG. 4.

FIG. 5 shows that a transparent window 110 allows a light emitted from a pickup 21 to access a disk D without compromising the sealed state of a case 120. In a prior art, a shutter is opened and closed to open an opening hole through which a light accesses the disk D. In contrast, an embodiment of the present invention allows a light to directly access the disk D through the transparent window 110. Assuming that a distance t from a surface of the transparent window 110 to the disk D is 1 mm, a numerical aperture NA of a lens of the pickup 21 is 0.6, and a refractive index n of the transparent window 110 is 1.5, the diameter d of the light to be focused on the disk D at the surface of the transparent window 110 is 0.8 mm (obtained by $(2 \times t \times NA)/n = (2 \times 1 \times 0.6)/1.5$). This means that there is no problem accessing the disk D using the light if a width W of the transparent window 110 is wider than 0.8 mm. The width W of the transparent window 110 may vary depending on the material of the transparent window 110, the numerical aperture NA, or the distance t. However, for a disk cartridge according to an embodiment of the present invention, 2 mm is a sufficient width for the width W of the transparent window 110. In otherwords, dimensions of a disk cartridge need not be altered by incorporating the transparent window 110.

According to an aspect of the present invention, the transparent window 110 is attachable to and detachable from the opening hole 101, as shown in FIG. 3. Thus, the transparent window 110 may be replaced with a new one if defects such as scratches occur on the transparent window 110.

FIGS. 3 and 4 show that it is not necessary for the disk cartridge 100 to have a shutter to open when entering the disk drive 20 shown in FIG. 1. Therefore, the opening lever 22 shown in FIG. 1 is also not needed. After the disk cartridge 100 enters the disk drive device 20 shown in FIG. 1, the pickup 21 radiates a light to the disk D through the transparent window 110. Next, a recording and/or reproducing operation proceeds with the light reflected from the disk D being received.

The light emitted from the pickup 21 accesses the disk D in the same way as in the conventional art. However, since the disk cartridge 100 has hardly any regions opened, the possibility of dust entering into the disk cartridge 100 is considerably reduced. This in turn results in a reduction in the possibility of errors occurring during signal processing. However, a light signal may be affected by dust on a surface of the transparent window 110, if the diameter of particles of dust is 30% of the diameter of a light incident on the transparent window 110. Thus, if the diameter of the light is 0.8 mm as described above, particles of dust with a diameter of over 0.24 mm can affect the light signal. However, particles of dust with such a diameter are readily observed by the naked eye and can be easily removed. Also, as described above, the transparent window 110 may be replaced with a new one if it gets scratched.

Figure 6:
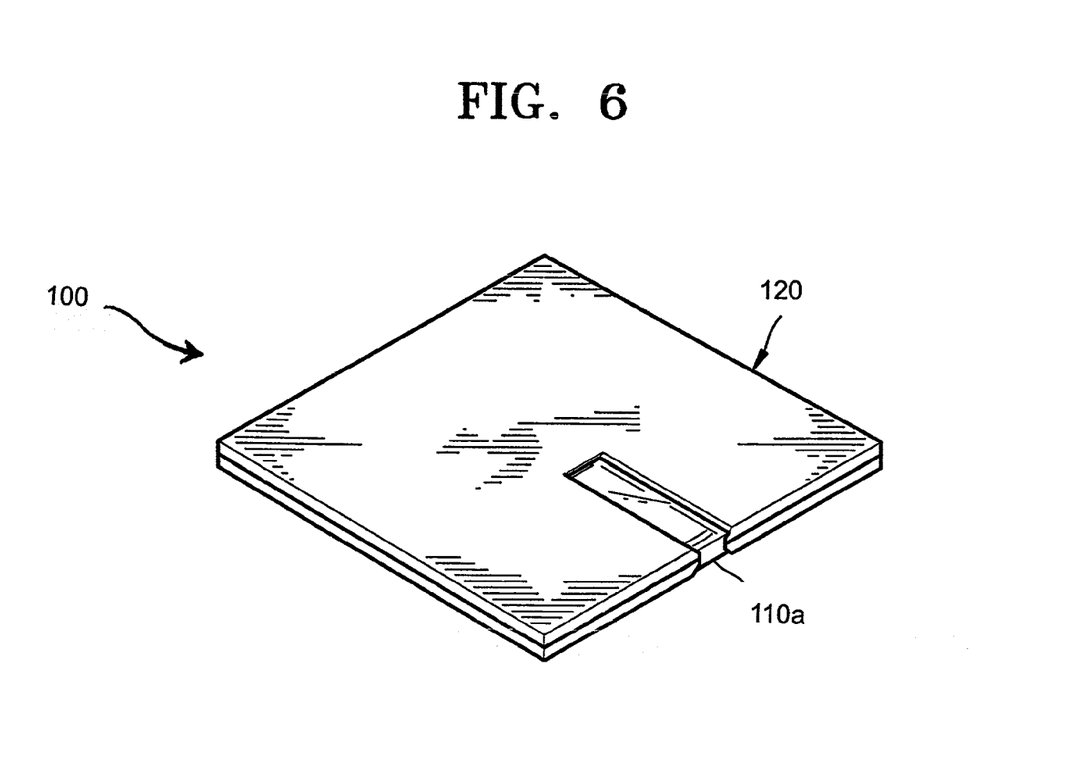
FIG. 6 is a perspective view of a disk cartridge according to another embodiment of the present invention.

According to another embodiment of the present invention, the transparent window 110 is modified to protect the transparent window 110 from scratches. FIG. 6 shows that a transparent window 110a is manufactured and/or installed so that its surface is inwardly depressed relative to a surface of a case 120. The inwardly depressed transparent window 110a lowers the probability that objects will touch the transparent window 110a, and reduces the possibility of scratches to the transparent window 110a.

Figure 7:
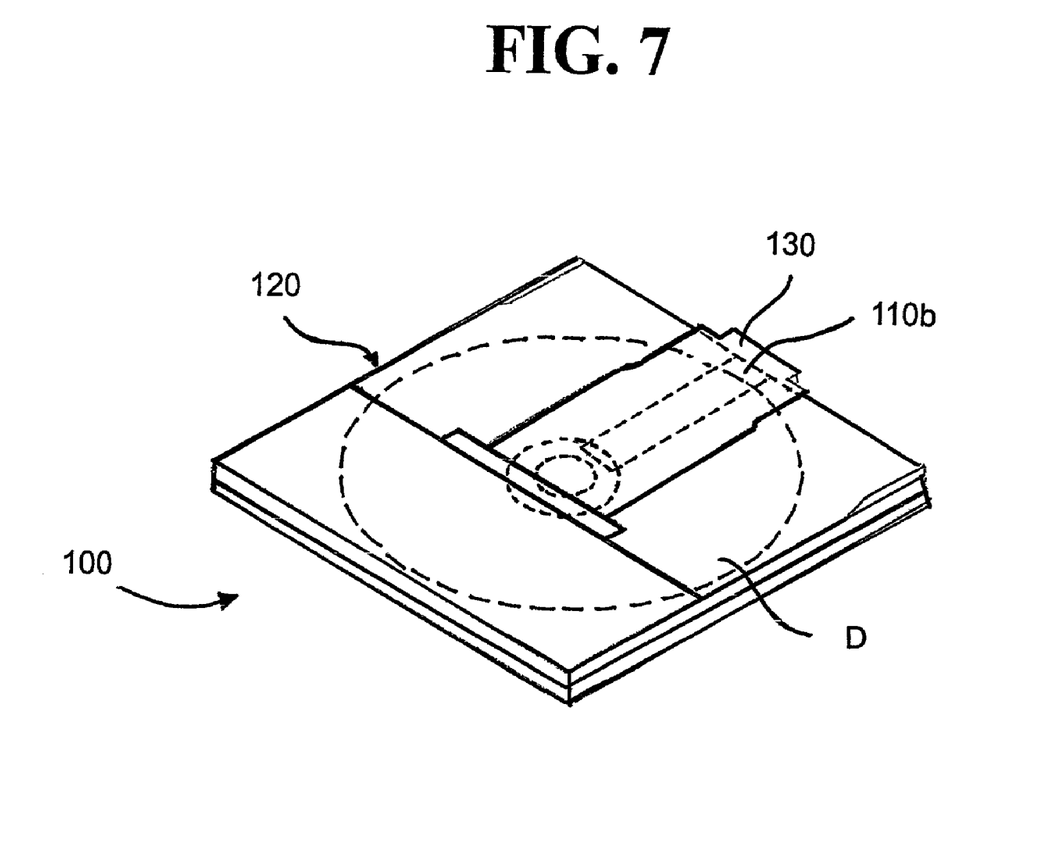
FIG. 7 is a perspective view of a disk cartridge according to yet another embodiment of the present invention.

According to yet another embodiment of the present invention, the transparent window 110 may be protected from scratches by using a conventional shutter mechanism. FIG. 7 shows that a transparent window 110b (either inwardly depressed or at level with a surface of a case 120) is covered by a shutter 130 that selectively opens and closes to reveal the transparent window 110b. The transparent window 110b seals a disk cartridge 100 having a disk D and prevents dust from entering the disk cartridge 100. The shutter 130 provides protection to the transparent window 110b from scratches.

A disk cartridge is provided with a transparent window through which a light accesses a disk. The transparent window prevents foreign matter such as dust from entering the disk cartridge.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk cartridge, comprising:
   a case to contain a disk including an aperture, a portion of which extends to and around an edge of the case, through which optical access to at least one of opposing surfaces of the disk is possible; and
   a member including two substantially parallel extensions at least one of which being a window to allow for the optical access to the at least one of the opposing surfaces of the disk and an end to form either a bridge from one parallel extension to the other and/or to fill the portion of the aperture located around the edge of the case, the member being attachable to and detachable from the case, wherein, when attached to the case, the member fits substantially entirely within the aperture, and wherein a profile of the member in a longitudinal direction thereof includes depressions on each lateral side of the member with corresponding edges of the case being formed to fit around the profile of the member.

2. The disk cartridge of claim 1, wherein the member is installed so that an outer surface of the member is inwardly depressed relative to a surface of the case.

3. The disk cartridge of claim 2, wherein the member is attachable to and detachable from the case, and is formed of at least one of a glass and acryl.

4. The disk cartridge of claim 1, wherein the member is formed of at least one of a glass and acryl.

5. The disk cartridge of claim 1, wherein the member is installed so that an outer surface of the member is level with a surface of the case.

6. The disk cartridge of claim 1, wherein the member has a width of at least 0.8 mm.

7. The disk cartridge of claim 1, wherein the member has a width of ~2 mm.

8. The disk cartridge of claim 1, wherein the member is installed to the case to prevent an inflow of a foreign matter into the case.

9. A member including a pair of windows and an end to connect the windows in a substantially parallel arrangement, the member being provided in a disk cartridge having a case to contain a disk, wherein the member is attachable to and detachable from the case and allows an external light to access opposing surfaces of the disk in the case through the windows, wherein a profile of the member in a longitudinal direction thereof includes depressions on each lateral side of the member with corresponding edges of the case being formed to fit around the profile of the member.

10. The member of claim 9, wherein the member is formed of at least one of a glass or acryl.

11. The member of claim 10, wherein the member has a height so that the outer surface of the member is one of inwardly depressed relative to and at level with a surface of the case.

12. The member of claim 11, wherein the member has a width of ~2 mm.

13. A disk cartridge, comprising:
   a case to contain a disk, wherein the case includes upper and lower surfaces, each surface including an aperture, a portion of which extends to and around an edge of the case, through which optical access to at least one of opposing surfaces of the disk is possible; and
   a member including two substantially parallel extensions at least one of which being a window to allow for the optical access to the at least one of the opposing surfaces of the disk and an end to form either a bridge from one parallel extension to the other and/or to fill the portion of the aperture located around the edge of the case, wherein the member is attachable to and detachable from the case and, when attached to the case, fits substantially entirely within the aperture, and wherein a profile of the member in a longitudinal direction thereof includes depressions on each lateral side of the member with corresponding edges of the case being formed to fit around the profile of the member.

14. The disk cartridge of claim 13, wherein the member is installed so that the top and bottom surfaces of the member are one of inwardly depressed relative to and level with the upper and lower surfaces of the case, respectively.

15. The disk cartridge of claim 14, wherein the member is attachable to and detachable from the case, and is formed of at least one of a glass and acryl.

16. The disk cartridge of claim 15, wherein the member is installed to the case to prevent an inflow of a foreign matter into the case.

17. A disk cartridge and pickup assembly, comprising:
   a case to contain a disk including an aperture, a portion of which extends to and around an edge of the case, through which optical access to at least one of opposing surfaces of the disk is possible;

a member including two substantially parallel extensions at least one of which being a window to allow for the optical access to the at least one of the opposing surfaces of the disk and an end to form either a bridge from one parallel extension to the other and/or to fill the portion of the aperture located around the edge of the case, the member being attachable to and detachable from the case; and a pickup provided with a lens, to emit light onto the disk through the at least one window, wherein, when attached to the case, the member fits substantially entirely within the aperture, and wherein a profile of the member in a longitudinal direction thereof includes depressions on each lateral side of the member with corresponding edges of the case being formed to fit around the profile of the member.

18. The disk cartridge and pickup assembly of claim 17, wherein the member has a width of at least W corresponding to the following relationship:

$$W = \frac{2t \cdot NA}{n}$$

where t is a distance from an outer surface of the member to the disk, NA is a numerical aperture of the lens of the pickup which emits the external light and n is a refractive index of the member.

19. The disk cartridge and pickup assembly of claim 17, wherein the member is installed so that an outer surface of the member is level with a surface of the ease.

20. A disk cartridge, comprising:

a case to contain a disk including an aperture, a portion of which extends to and around an edge of the case, through which optical access to at least one of opposing surfaces of the disk is possible; and a member including two substantially parallel extensions at least one of which being a window to allow for the optical access to the at least one of the opposing surfaces of the disk and an end to form either a bridge from one parallel extension to the other and/or to fill the portion of the aperture located around the edge of the case, the member being attachable to and detachable from the case, wherein, when attached to the case, the member fits substantially entirely within the aperture, and wherein a profile of the member in a longitudinal direction thereof includes first and second shapes on each lateral side of the member with corresponding edges of the case being formed to compliment the profile of the member.

* * * * *

UNITED STATES PATENT AND TRADEMARK OFFICE
CERTIFICATE OF CORRECTION

| | | |
|---|---|---|
| PATENT NO. | : 7,107,604 B2 | |
| APPLICATION NO. | : 10/029910 | |
| DATED | : September 12, 2006 | |
| INVENTOR(S) | : Gyu-chan Jun et al. | |

It is certified that error appears in the above-identified patent and that said Letters Patent is hereby corrected as shown below:

Column 6, line 5, change "ease" to -- case--

Signed and Sealed this

Tenth Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,107,604 B2 | Page 1 of 1 |
| APPLICATION NO. | : 10/029910 | |
| DATED | : September 12, 2006 | |
| INVENTOR(S) | : Gyu-chan Jun et al. | |

It is certified that error appears in the above-identified patent and that said Letters Patent is hereby corrected as shown below:

On TITLE page item (56) References Cited, OTHER PUBLICATIONS insert --English translation of Japan Kokai Document No. 62-267985-- before "Japanese Office Action dated Jun. 3, 2003"

Signed and Sealed this

Eighth Day of January, 2008

JON W. DUDAS
*Director of the United States Patent and Trademark Office*